US010572519B2

(12) United States Patent
Fang

(10) Patent No.: US 10,572,519 B2
(45) Date of Patent: Feb. 25, 2020

(54) SYSTEMS AND METHODS TO SEARCH RESUMES BASED ON KEYWORDS

(71) Applicant: Facebook, Inc., Menlo Park, CA (US)

(72) Inventor: Miaoqing Fang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 638 days.

(21) Appl. No.: 14/987,654

(22) Filed: Jan. 4, 2016

(65) Prior Publication Data

US 2017/0193089 A1 Jul. 6, 2017

(51) Int. Cl.
*G06F 16/00* (2019.01)
*G06F 16/33* (2019.01)
*G06Q 10/10* (2012.01)
*G06F 16/35* (2019.01)

(52) U.S. Cl.
CPC ...... *G06F 16/3344* (2019.01); *G06F 16/3347* (2019.01); *G06F 16/353* (2019.01); *G06Q 10/105* (2013.01)

(58) Field of Classification Search
CPC ......... G06F 17/30684; G06F 17/30707; G06F 16/3344; G06F 16/353; G06F 16/3347; G06Q 10/105
See application file for complete search history.

(56) References Cited

U.S. PATENT DOCUMENTS

| | | | |
|---|---|---|---|
| 6,728,695 B1* | 4/2004 | Pathria | G06F 17/2715 |
| 7,383,269 B2* | 6/2008 | Swaminathan ... | G06F 17/30011 |
| 9,916,383 B1* | 3/2018 | Ching | G06F 17/30864 |
| 2008/0215574 A1* | 9/2008 | Lin | G06F 17/30675 |
| 2009/0182733 A1* | 7/2009 | Itoh | G06F 17/30011 |
| 2009/0216735 A1* | 8/2009 | Dexter | G06F 17/30011 |
| 2009/0300006 A1* | 12/2009 | Bose Rantham Prabhakara | G06F 17/30619 |
| 2010/0153324 A1* | 6/2010 | Downs | G06F 17/2745 706/21 |
| 2014/0188904 A1* | 7/2014 | Sciuk | G06Q 30/0633 707/749 |
| 2015/0350139 A1* | 12/2015 | Speer et al. | G06F 16/9535 709/206 |
| 2016/0179945 A1* | 6/2016 | Lastra Diaz | G06F 17/30734 707/739 |

OTHER PUBLICATIONS

Lee et al.,"Document ranking and the vector-space model",IEEE,Mar./Apr. 1997,pp. 67-75 (Year: 1997).*
Singh et al., "Vector Space Model: An Information Retrieval System", Mar. 2015, International Journal of Advanced Engineering Research and Studies, pp. 141-143 (Year: 2015).*

* cited by examiner

*Primary Examiner* — Alexander Khong
(74) *Attorney, Agent, or Firm* — Sheppard Mullins Richter & Hampton LLP

(57) ABSTRACT

Systems, methods, and non-transitory computer readable media are configured to convert resume text in a resume into an array of values representing a frequency of keywords associated with the resume text. An array of values representing a frequency of search terms associated with a search is generated. The array of values representing a frequency of keywords associated with the resume text and the array of values representing a frequency of search terms associated with a search to generate a score for the resume are combined.

20 Claims, 8 Drawing Sheets

Resume to Keywords Conversion Module 202

Model Creation Module
204

Anchor Point Determination Module
206

Keyword Generation Module
208

```
┌─────────────────────────────────────────────────────────────────────┐
│ Train a model based on terms from a resume corpus to create a vector space of │
│                 vector representations of the terms                 │
│                                 502                                 │
└─────────────────────────────────────────────────────────────────────┘
                                    │
                                    ▼
┌─────────────────────────────────────────────────────────────────────┐
│ Identify keywords as anchor points in the vector space for a set of search terms │
│                          used by recruiters                         │
│                                 504                                 │
└─────────────────────────────────────────────────────────────────────┘
                                    │
                                    ▼
┌─────────────────────────────────────────────────────────────────────┐
│  Create a chunk of terms from the resume text based on a selected chunk size │
│                   and a selected increment value                    │
│                                 506                                 │
└─────────────────────────────────────────────────────────────────────┘
                                    │
                                    ▼
┌─────────────────────────────────────────────────────────────────────┐
│   Identify a vector representation in the vector space for each term in the chunk │
│                                 508                                 │
└─────────────────────────────────────────────────────────────────────┘
                                    │
                                    ▼
```

FIGURE 5A

SYSTEMS AND METHODS TO SEARCH RESUMES BASED ON KEYWORDS

FIELD OF THE INVENTION

The present technology relates to the field of machine learning. More particularly, the present technology relates to techniques for searching resumes based on keywords.

BACKGROUND

Recruiters can play a primary role in helping organizations locate job candidates. In some cases, a recruiter can proactively seek job candidates for the organization. In other cases, job candidates can initiate contact with an organization through a recruiter of the organization. The process to assess job candidates often can be initiated through electronic receipt by the organization of a resume of a job candidate. An organization can receive large volumes of resumes. The sheer number of resumes received by such an organization can create challenges for the recruiter in vetting the resumes to identify job candidates suited to the organization.

SUMMARY

Various embodiments of the present technology can include systems, methods, and non-transitory computer readable media configured to convert resume text in a resume into an array of values representing a frequency of keywords associated with the resume text. An array of values representing a frequency of search terms associated with a search is generated. The array of values representing a frequency of keywords associated with the resume text and the array of values representing a frequency of search terms associated with a search are combined to generate a score for the resume.

In an embodiment, the conversion of the resume text further comprises: training a model based on terms from a resume corpus to create a vector space of vector representations of the terms; and identifying keywords as anchor points in the vector space for a set of search terms used by recruiters.

In an embodiment, the conversion of the resume text further comprises: creating a chunk of terms from the resume text based on a selected chunk size and a selected increment value; and identifying a vector representation in the vector space for each term in the chunk.

In an embodiment, the conversion of the resume text further comprises: combining the vector representations for each term in the chunk to generate a vector representation of the chunk.

In an embodiment, conversion of the resume text further comprises: identifying an anchor point constituting a keyword that is nearest to the vector representation of the chunk.

In an embodiment, the array of values representing a frequency of keywords associated with the resume text comprises values associated with a frequency of keywords identified for a plurality of chunks from the resume text.

In an embodiment, the conversion of the resume text further comprises: normalizing the array of values representing a frequency of keywords associated with the resume text based on relative importance of the keywords.

In an embodiment, the array of values representing a frequency of keywords associated with the resume text is a row in a resume matrix and the array of values representing a frequency of search terms associated with a search is a column of a search term matrix.

In an embodiment, the combination of the array of values comprises: multiplying the resume matrix and the search term matrix to generate a score matrix.

In an embodiment, each column of the score matrix reflects resume scores for an associated search.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2 illustrates an example resume to keywords conversion module, according to an embodiment of the present technology.

FIGS. 5A-5B illustrate a second example method to generate a score for a resume based on search terms associated with a search, according to an embodiment of the present technology.

Figure 1:
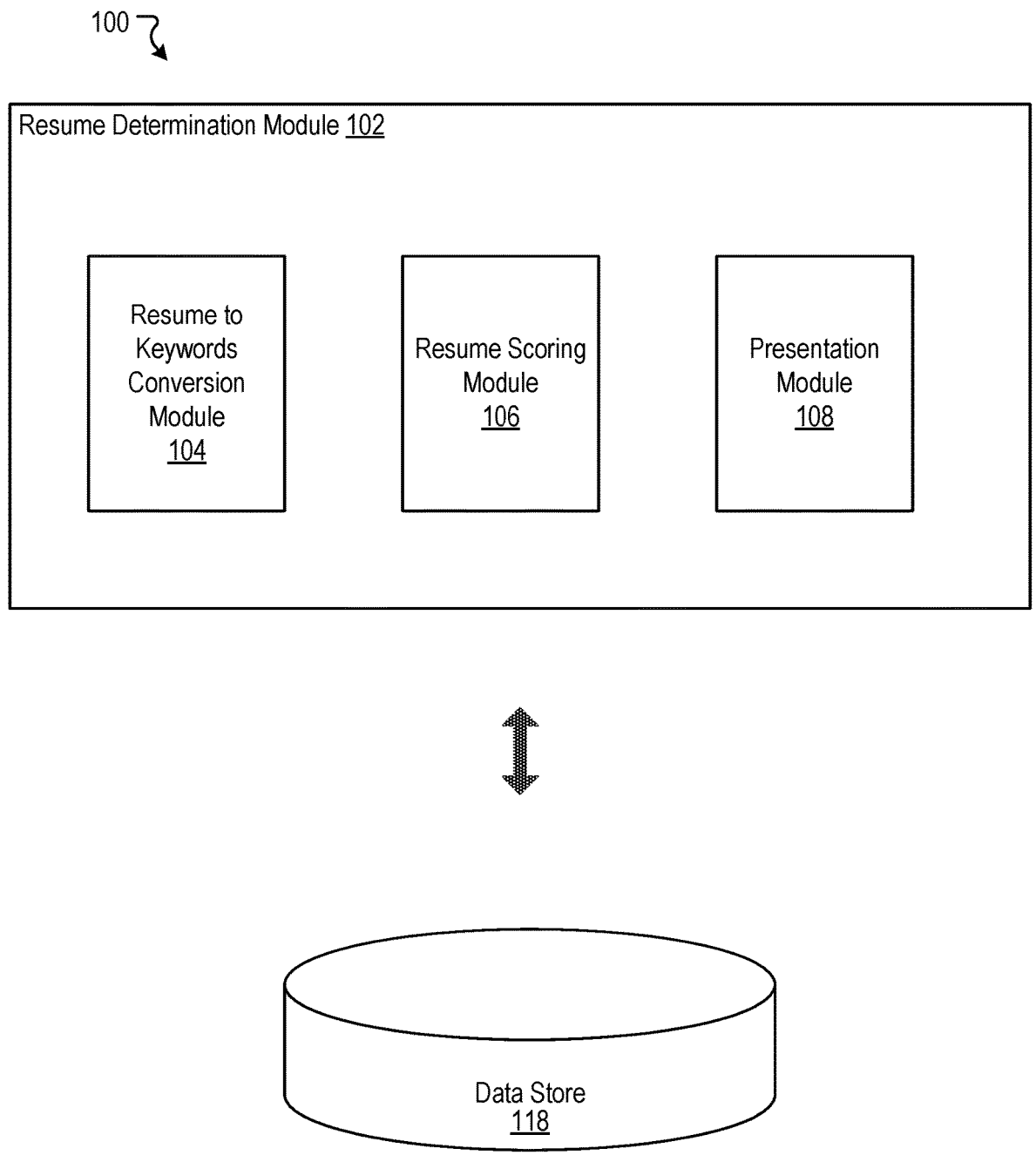
FIG. 1 illustrates a system including an example resume determination module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Searching for Resumes Based on Machine Learning Model

As mentioned, recruiters can play a primary role in helping organizations locate job candidates. In some cases, a recruiter can proactively seek job candidates for the organization. In other cases, job candidates can initiate contact with an organization through a recruiter of the organization. The process to assess job candidates often can be initiated through electronic receipt by the organization of a resume of a job candidate. Certain organizations can receive large volumes of resumes. The sheer number of resumes received by such organizations can create challenges for recruiters in vetting the resumes to identify suitable job candidates.

One common challenge confronted by organizations and their recruiters is effectively searching through vast amounts of resume data. One attempt to address the challenge involves use by recruiters of cumbersome keyword searches employing long strings of boolean logic. The searches can reflect efforts by recruiters to comprehensively search through resumes for intended job candidates that satisfy various employment criteria selected by the recruiter. Because an employment criterion can be expressed in different ways using different terms in a resume, recruiters often resort to lengthy search expressions that try to account for nearly every single potential term that could be used to express the criterion. When recruiters are looking for resumes that satisfy multiple employment criteria, the search expressions can attendantly multiply in length. Even when the effort is expended to create them according to these conventional techniques, the search expressions still may miss important terms that would otherwise uncover desired resumes.

An improved approach rooted in computer technology overcomes the foregoing and other disadvantages associated with conventional approaches specifically arising in the realm of computer technology. Systems, methods, and computer readable media of the present technology can identify and score resumes based on their relevance to one or more search terms associated with searches performed by an entity, such as a recruiter. A machine learning model can be trained using terms from a corpus of resumes (or curricula vitae). The model can be based on a technique that converts the terms into vector representations in a vector space based on meaning of the terms. A set of search terms used by a plurality of recruiters can be represented in the vector space as a set of keywords (or anchor points). When a recruiter wishes to perform one or more searches on a set of resumes, each resume can be converted into an array of values representing a frequency of unique keywords by determining, for each identified chunk of terms in the resume, a nearest keyword. Each array of values representing a frequency of unique keywords can be normalized to reflect the relative importance of the keywords associated with array. Arrays of values representing a frequency of unique keywords for the set of resumes can be rows in a resume matrix. Search terms of the recruiter for each search to be performed can be expressed as an array of values representing a frequency of search terms associated with the search. Arrays of values representing a frequency of search terms associated with various searches can be columns in a search term matrix. A matrix multiplication can be performed for the resume matrix and the search term matrix to generate a score matrix. The resume scores reflected in the score matrix can determine one or more resumes most related to each search as well as one or more searches to which each resume is most related. More details regarding the present technology are described herein.

FIG. 1 illustrates an example system 100 including an example resume determination module 102 configured to score resumes based on their relevance to one or more search terms associated with searches to be performed by persons, such as recruiters, for an organization (e.g., a technology company), according to an embodiment of the present technology. The search terms can be any number of search terms, such as one search term or more than one search term. Based on the resume determination module 102, a search of resumes based on selected search terms can account for synonyms and other terms that are similar in meaning to the search terms. As a result, a recruiter can perform for the organization more streamlined searches involving fewer selected search terms without attempting a long listing of synonyms accompanied by complex boolean operations. An organization can be any entity, such as a company, an establishment, a non-profit, a business, etc. The organization can be of any type or in any industry, such as aerospace and defense, agriculture, automotive, chemicals, construction, consumer goods and services, energy, financial services, firearms, food and beverage, health care, information and technology (e.g., software, hardware, etc.), real estate, manufacturing, mining and drilling, pharmaceuticals and biotechnology, publishing, telecommunications, transportation, etc. While a technology company may be exemplarily discussed in certain contexts for ease of explanation herein, an organization of any industry type or endeavor can be applicable to the present technology. For example, the present technology can be applied to any other type of organization by tailoring the training of a machine learning model with features and keywords that are relevant to the type of organization and its recruiting strategy. Further, the search technique described in relation to the resume determination module 102 can be applied to other types of searches apart from resumes.

The resume determination module 102 can include a resume to keywords conversion module 104, a resume scoring module 106, and a presentation module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the resume determination module 102 can be implemented in any suitable combinations.

The resume to keywords conversion module 104 can develop a machine learning model for creating vector representations of terms that appear in a resume corpus. A set of search terms used by a plurality of recruiters can be represented in the vector space as a set of keywords (or anchor points). To perform one or more searches on a set of resumes, each resume can be converted into an array of values representing a frequency of keywords by determining, for each identified chunk of tokens in the resume, a nearest keyword. Each array can be normalized to reflect the relative importance of the keywords represented in the array. Each array of the arrays associated with the set of resumes can be represented as a row in a resume matrix. The resume to keywords conversion module 104 is discussed in more detail herein.

The resume scoring module 106 can receive search terms for searches to be performed. For each respective search, search terms can be expressed as an array of values representing a frequency of search terms. Each array of the arrays associated with the searches can be represented as a column in search term matrix. A matrix multiplication of the resume matrix and the search term matrix can be performed. The matrix multiplication can generate a score matrix reflecting resume scores to identify resumes that are most relevant to the searches. The resume scoring module 106 is discussed in more detail herein.

The presentation module 108, through a suitable user interface, can allow an entity, such a recruiter, to select or provide a set of resumes on which one or more searches are to be performed. The presentation module 108, through the user interface, can prompt the user to provide one or more search terms for each search to be performed against the set of resumes. In response to provision of the set of resumes and search terms, the presentation module 108, through the user interface, can present, for each search, a list of resumes relevant to the search. In addition, the presentation module 108, through the user interface, can present, for each resume, a list of searches that are most relevant to the resume. A list can be sorted based on applicable resume scores.

In some embodiments, the resume determination module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the resume determination module 102 can be, in part or in whole, implemented as software running on one or more computing devices or systems, such as on a server or a client computing device. For example, the resume determination module 102 can be, in part or in whole, implemented within or configured to operate in conjunction or be integrated with a social networking system (or service), such as a social networking system 630 of FIG. 6. As another example, the resume determination module 102 can be implemented as or within a dedicated application (e.g., app), a program, or an applet running on a user computing device or client computing system. In some instances, the resume determination module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the resume determination module 102. The data can include data relating to, for example, a resume corpus, a machine learning model to create vector representations of terms, anchor points, threshold distance values, a set of resumes, chunks from resume text, vectors associated with chunks, normalizing parameters, a resume matrix, search terms provided by a recruiter, a search term matrix, resume scores, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the resume determination module 102 can be configured to communicate and/or operate with the data store 118.

FIG. 2 illustrates an example resume to keywords conversion module 202, according to an embodiment of the present technology. In some embodiments, the resume to keywords conversion module 104 of FIG. 1 can be implemented with the resume to keywords conversion module 202. The resume to keywords conversion module 202 can include a model creation module 204, an anchor point determination module, 206, and a keyword generation module 208.

The model creation module 204 can develop a machine learning model for creating vector representations of terms that appear in a resume corpus. A term can be one or more words. The model can be trained using terms (n-grams such as unigrams, bigrams, etc.) that appear in the resume corpus. In some instances, the resume corpus can include resumes received by an organization. For example, the resumes can include resumes of employees of the organization. The number of resumes provided to train the model can be any suitable number of resumes. For instance, the number of resumes can be approximately one million. In other instances, the number of resumes can be a larger or smaller value. Terms from the resume corpus can be identified and extracted to train the model.

The model can be trained using any suitable technique (or algorithm) that can create a vector space of vector representations of terms from resumes based on semantic meaning of the terms. In this regard, for terms that are relatively close in meaning, the technique can create vector representations of the terms that are relatively close to one another in the vector space. Likewise, for terms that are relatively far in meaning, the technique can create vector representations of the terms that are relatively far to one another in the vector space. Terms with similar or identical meanings are clustered together. The vector space can represent a dictionary of terms. As just one illustration, if the resume corpus is one million resumes, then the vector space can represent a dictionary of approximately eight million terms, depending on the content and extent of the resumes. In some embodiments, the technique to create a vector space of vector representations of terms can be based at least in part on a word2vec technique.

Certain terms can be eliminated from training of the model to account for anomalies or mistakes in the resume corpus or to enhance the quality of the data provided for training. In some embodiments, a number of appearances of a term must satisfy a threshold appearance value before the term is used to train the model. When the number of appearances of the term does not satisfy the threshold appearance value, the term can be eliminated from training of the model. For instance, if the resume corpus is one million resumes, the threshold appearance value can be, for example, 20 or some other suitable value.

The anchor point determination module 206 can receive a set of search terms to perform searches of resumes. The set of search terms can be a combination of search terms used by a plurality of recruiters for various searches over a selected time interval. The set of search terms can be any suitable number of search terms. The set of search terms can be reflect any scope of classification. In this regard, search terms in the set can span a spectrum between coarse descriptors to fine grained descriptors associated with or otherwise indicative of a job title, position, category, or role. The set of search terms can be applied to the model to determine their locations in the vector space. For each search term in the set, a corresponding vector representation in the vector space can be determined. The corresponding vector can constitute an anchor point in the vector space. Each anchor point can be referred to as a keyword.

The keyword generation module 208 can generate an array of values representing a frequency of keywords from each resume in the set of resumes. In some instances, the recruiter can selected the set of resumes as the resumes against which one or more searches are to be performed. For each resume in the set, the keyword generation module 208 can analyze resume text as a continuous sequence of terms. A chunk associated with a selected chunk size can identify a range of terms over which to analyze resume text. Any suitable chunk size can be used. For example, the chunk size can be four terms in some implementations. Based on the selected chunk size, a first chunk of terms can be selected from a selected beginning term of the resume text. For example, if the resume text includes a statement "I worked at companyX as a mobile software_engineer" and the selected chunk size is four terms, the first chunk includes the terms "I", "worked", "at", and "companyX" in this example.

A vector representation in the vector space can be determined for each term of the four terms in the first chunk. The four vector representations associated with the first chunk can be combined (e.g., averaged) to determine a vector representations for the first chunk.

Next, based on a selected increment value, a second chunk of terms likewise can be processed. The selected increment value can be any suitable value. For example, the selected increment value can be two terms. The selected chunk size and the selected increment value can help to minimize artificial boundaries between chunks so that the meaning of the terms in the resume text are appropriately captured. The second chunk can begin at a term in the continuous sequence of resume text that is equal to the first term of the first chunk plus the selected increment value. In the example of a selected increment value of two terms, the second chunk can begin at a term that represents the third term of the first chunk and can include three successive terms from the continuous sequence of resume text. Continuing the example above relating to resume text including the statement "I worked at companyX as a mobile software_engineer" for the selected chunk size of four terms and a selected increment value of two terms, the second chunk includes the terms "at", "companyx", "as", and "a" in this example. A vector representation in the vector space can be determined for each term of the four terms in the second chunk. The four vector representations associated with the second chunk can be combined (e.g., averaged) to determine a vector representations for the second chunk. Further continuing the example above relating to resume text including the statement "I worked at companyX as a mobile software_engineer" for the selected chunk size of four terms and the selected increment value of two terms, the third chunk includes the terms "as", "a", "mobile", and "software_engineer" in this example. A term constituting an n-gram, such as a bi-gram (e.g., "software_engineer"), can be determined by any suitable technique. A vector representation in the vector space can be determined for each term of the four terms in the third chunk. The four vector representations associated with the third chunk can be combined (e.g., averaged) to determine a vector representations for the third chunk. This technique can be repeated for all subsequent chunks according to the selected increment value to the end of the continuous sequence of resume text.

For each vector representation of a chunk, a nearest anchor point in the vector space can be identified. The nearest anchor point can constitute a keyword. In some embodiments, a threshold distance value can be applied in the identification of a nearest anchor point (or keyword) to a vector representation of a chunk. The threshold distance value can be any suitable value. An anchor point identified by calculation of a distance that does not satisfy the threshold distance value can be discarded. In this regard, when a distance calculated for an anchor point nearest to a vector representation of a chunk exceeds the threshold distance value, the anchor point can be discarded. The application of a threshold distance value in the identification of an anchor point can reduce the likelihood of a determination of an incorrect anchor point for a chunk that is semantically unrelated.

The keyword generation module 208 can generate an array of values representing a frequency of unique keywords (or anchor points) identified for each resume in the set of resumes. The array can represent a number of occurrences (or frequency) of unique keywords in each resume. In some embodiments, the dimensions of the array can be associated with a number of keywords (or search terms) potentially used by a recruiter for a search. In some embodiments, the keyword generation module 208 can normalize each array so that more important keywords are provided more weight and less important keywords are provided less weight. In some embodiments, the normalization can be performed using a suitable TF-IDF technique. In some embodiments, the TF-IDF technique can generate a weight for each unique keyword represented in the array. For each keyword represented in the array, the associated weight can be multiplied with its corresponding value in the array to generate a normalized value in the array for the keyword. In some embodiments, the keyword generation module 208 can create a resume matrix in which each row of the resume matrix corresponds to a resume and contains the array of values representing a frequency of keywords associated with the resume.

Figure 3:
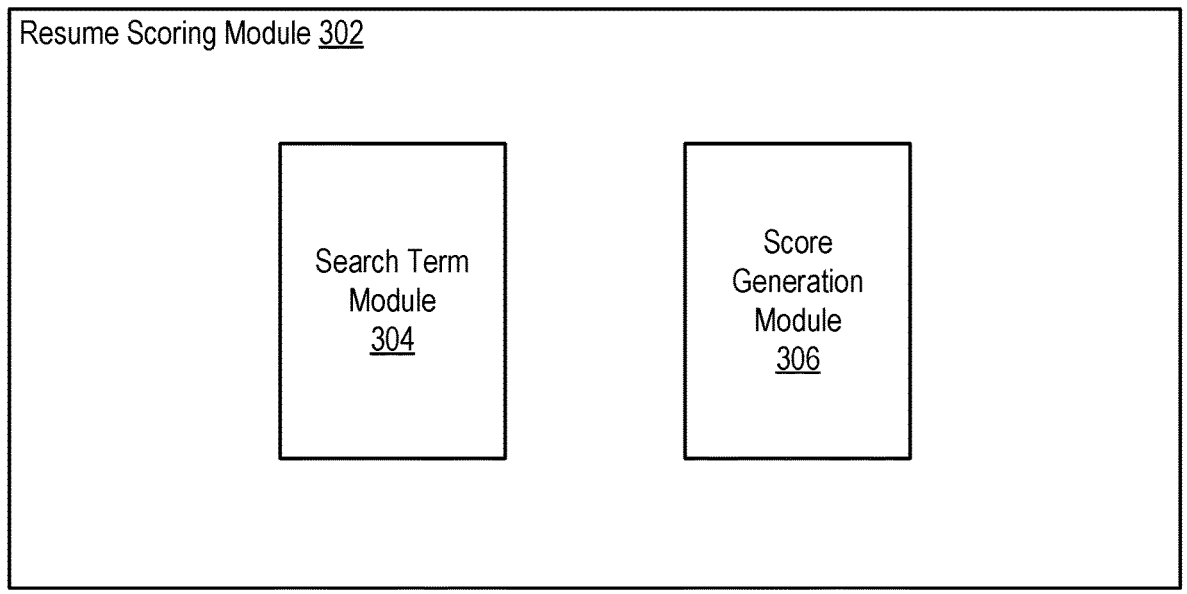
FIG. 3 illustrates an example resume scoring module, according to an embodiment of the present technology.

FIG. 3 illustrates an example resume scoring module 302, according to an embodiment of the present technology. In some embodiments, the resume scoring module 106 of FIG. 1 can be implemented with the resume scoring module 302. The resume scoring module 302 can include a search module 304 and a score generation module 306.

The search term module 304 can receive one or more search terms to be used by a recruiter to perform a search. The search terms associated with a search can be reflect any scope of classification. In this regard, search terms in the set can span a spectrum between coarse descriptors to fine grained descriptors associated with or otherwise indicative of a job title, position, category, or role. For each search, the search terms can be represented as an array of values representing a number of occurrences (or frequency) of each unique search term. In some embodiments, the search term module 304 can normalize each array so that more important search terms are provided more weight and less important keywords are provided less weight. In some embodiments, the normalization can be performed using a suitable TF-IDF technique. In some embodiments, the dimensions of the array can be associated with a number of search terms potentially used for the search. In some embodiments, the search term module 304 can create a search term matrix. Each column of the search term matrix can correspond to a particular search to be performed and can contain an array of values representing a frequency of search terms associated with the search.

The score generation module 306 can score resumes based on their relevance to one or more search terms associated with a search. In some embodiments, the score generation module 306 can combine an array of values representing a frequency of unique keywords associated with a particular resume with an array of values representing a frequency of unique search terms associated with a particular search to generate a score for the resume. In some embodiments, the array of values representing a frequency of unique keywords associated with a particular resume and the array of values representing a frequency of unique search terms associated with a particular search can be combined as a dot product. The score for the resume can reflect a level to which the resume is relevant to the search and its corresponding search terms.

In some embodiments, the score generation module 306 can perform a matrix multiplication on the resume matrix and the search term matrix to generate a score matrix. Each column of the score matrix can provide scores for the set of resumes reflecting the relevance of each respective resume to the search and its corresponding search terms associated with the column. The scores in a column can be sorted to generate an ordered list to identify the resumes that are most relevant to the search terms. A threshold value can be applied to the ordered list to present resumes having scores that satisfy the threshold value to a recruiter for further consideration or action. Each row of the score matrix can provide scores for an associated resume that reflect the relevance of the resume to a respective search reflected in each column. The scores provided in a row can inform a recruiter regarding one or more searches to which the resume is most relevant.

Figure 4:
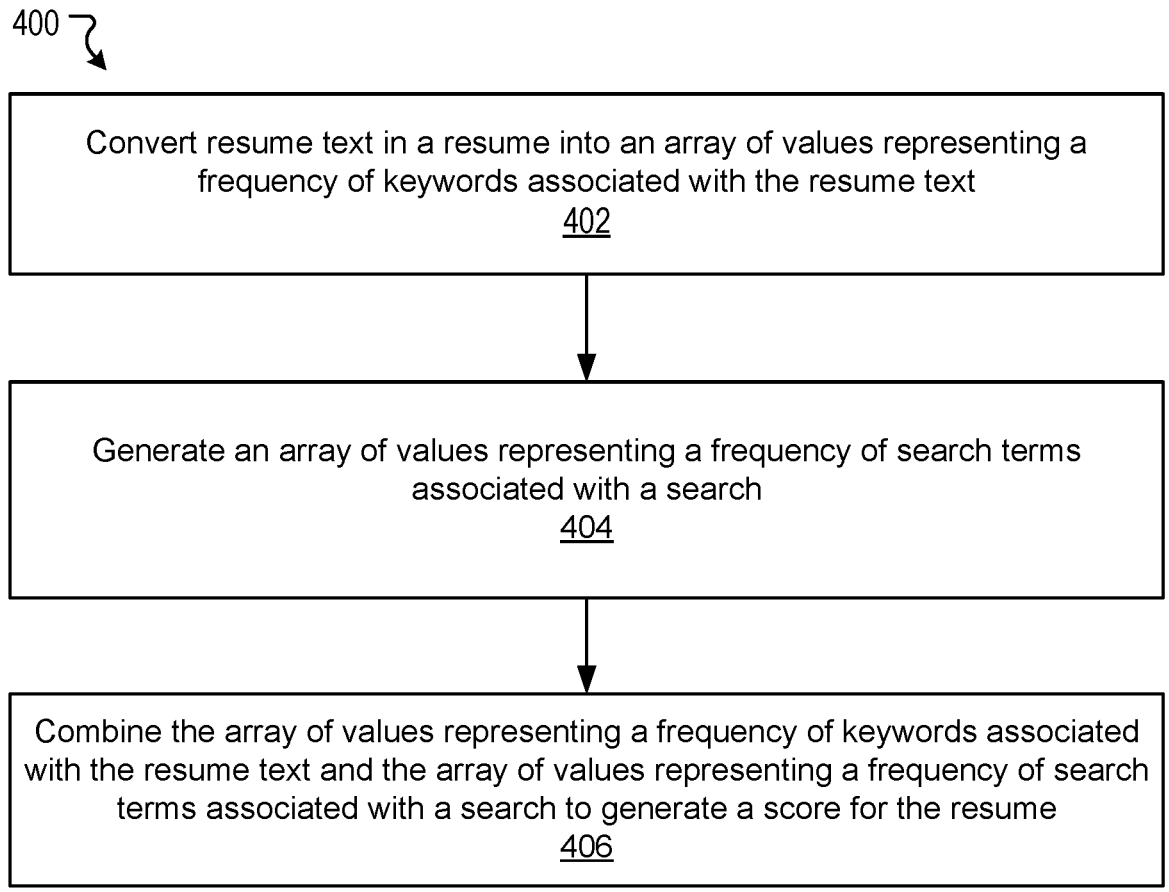
FIG. 4 illustrates a first example method to generate a score for a resume based on search terms associated with a search, according to an embodiment of the present technology.

FIG. 4 illustrates a first example method 400 to generate a score for a resume based on search terms associated with a search, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can convert resume text in a resume into an array of values representing a frequency of keywords associated with the resume text. At block 404, the method 400 can generate an array of values representing a frequency of search terms associated with a search. At block 406, the method 400 can combine the array of values representing a frequency of keywords associated with the resume text and the array of values representing a frequency of search terms associated with a search to generate a score for the resume. Other suitable techniques that incorporate various features and embodiments of the present technology are possible.

Figure 5B:
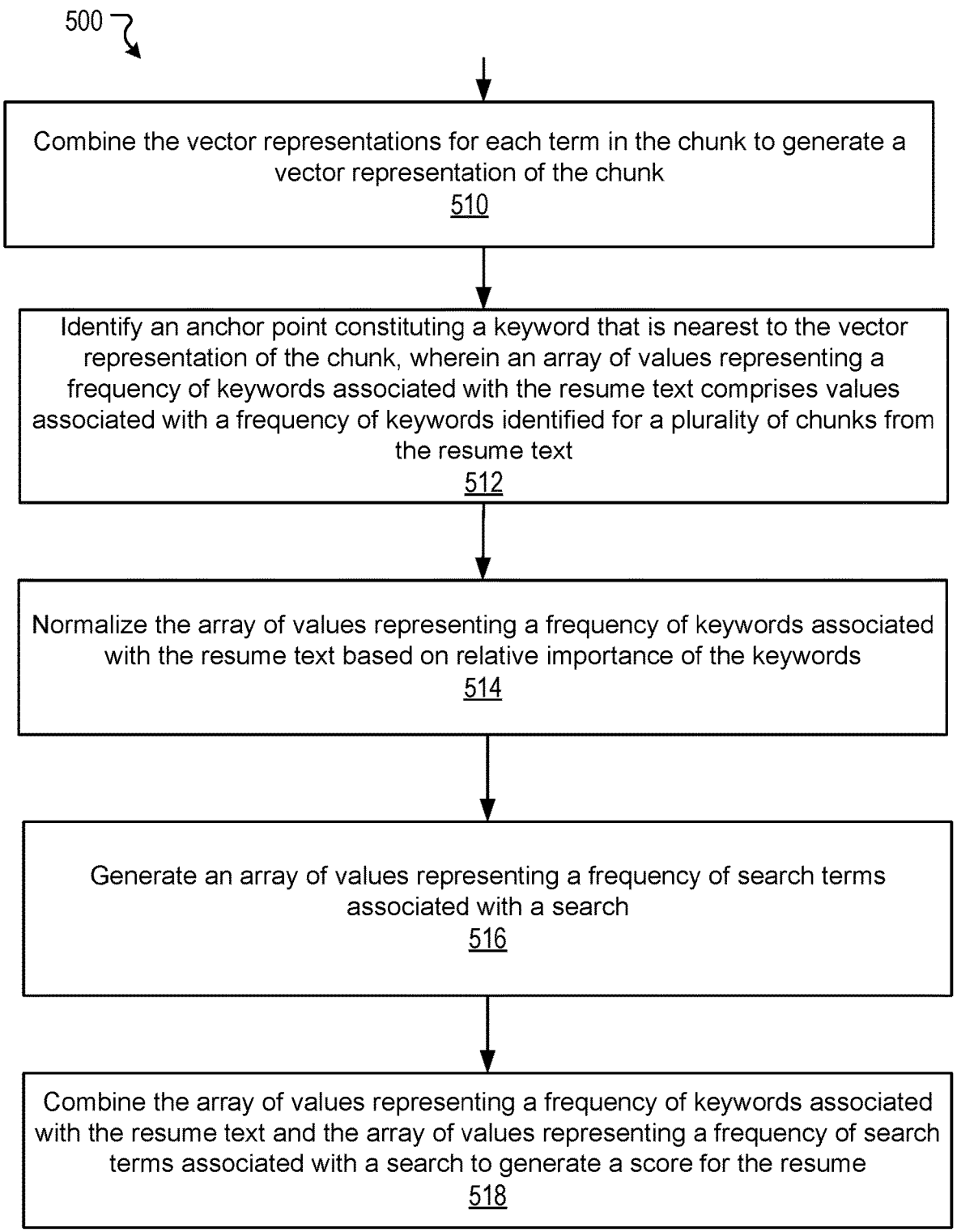

FIGS. 5A-5B illustrate a second example method 500 to generate a score for a resume based on search terms associated with a search, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can train a model based on terms from a resume corpus to create a vector space of vector representations of the terms. At block 504, the method 500 can identify keywords as anchor points in the vector space for a set of search terms used by recruiters. At block 506, the method 500 can create a chunk of terms from the resume text based on a selected chunk size and a selected increment value. At block 508, the method 500 can identify a vector representation in the vector space for each term in the chunk. At block 510, the method 500 can combine the vector representations for each term in the chunk to generate a vector representation of the chunk. At block 512, the method 500 can identify an anchor point constituting a keyword that is nearest to the vector representation of the chunk. An array of values representing a frequency of keywords associated with the resume text can comprise values associated with a frequency of keywords identified for a plurality of chunks from the resume text. At block 514, the method 500 can normalize the array of values representing a frequency of keywords associated with the resume text based on relative importance of the keywords. At block 516, the method 500 can generate an array of values representing a frequency of search terms associated with a search. At block 518, the method 500 can combine the array of values representing a frequency of keywords associated with the resume text and the array of values representing a frequency of search terms associated with a search to generate a score for the resume. Other suitable techniques that incorporate various features and embodiments of the present technology are possible.

Social Networking System—Example Implementation

Figure 6:
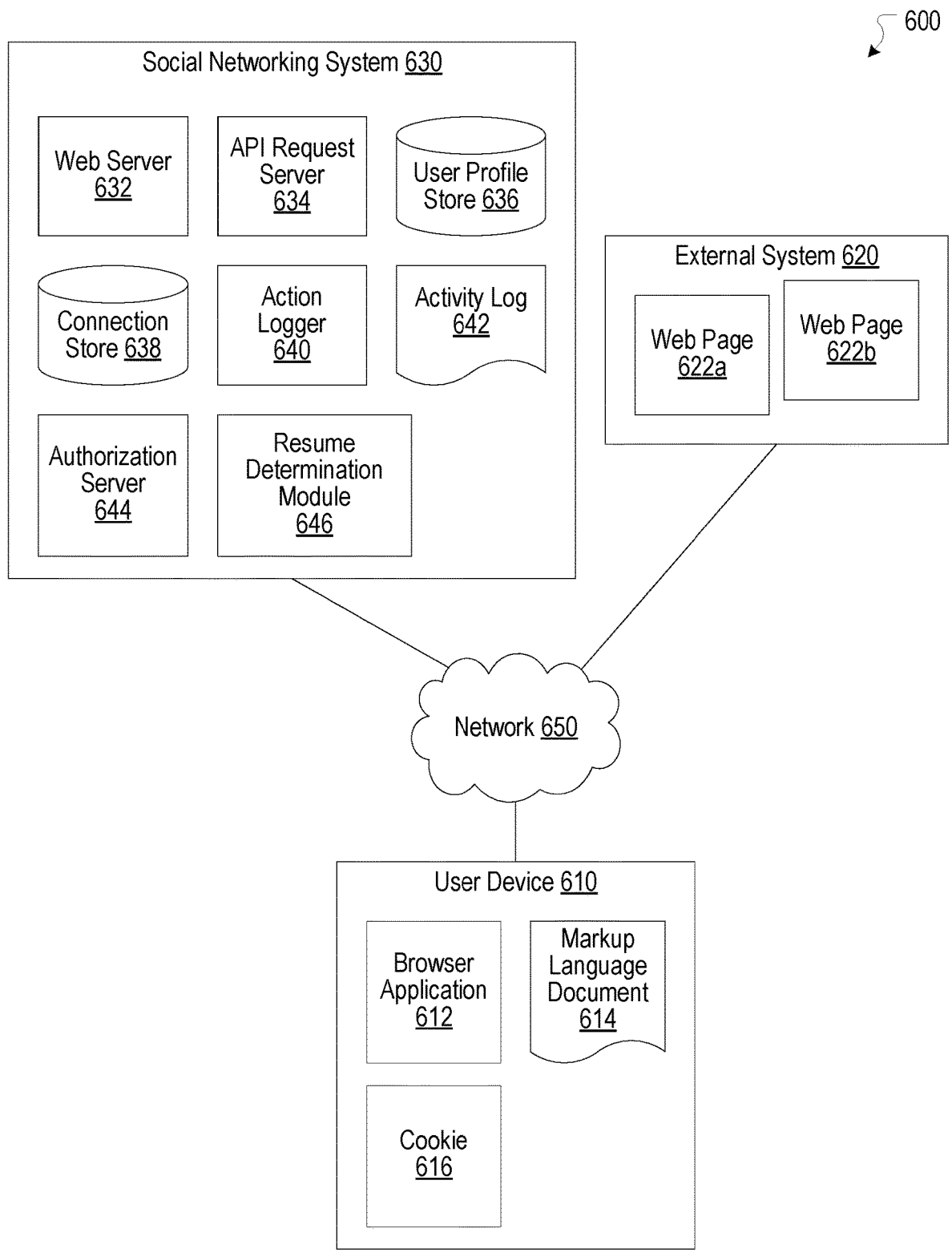
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a resume determination module 646. The resume determination module 646 can be implemented with the resume determination module 102, as discussed in more detail herein. In some embodiments, one or more functionalities of the resume determination module 646 can be implemented in the user device 610.

Hardware Implementation

Figure 7:
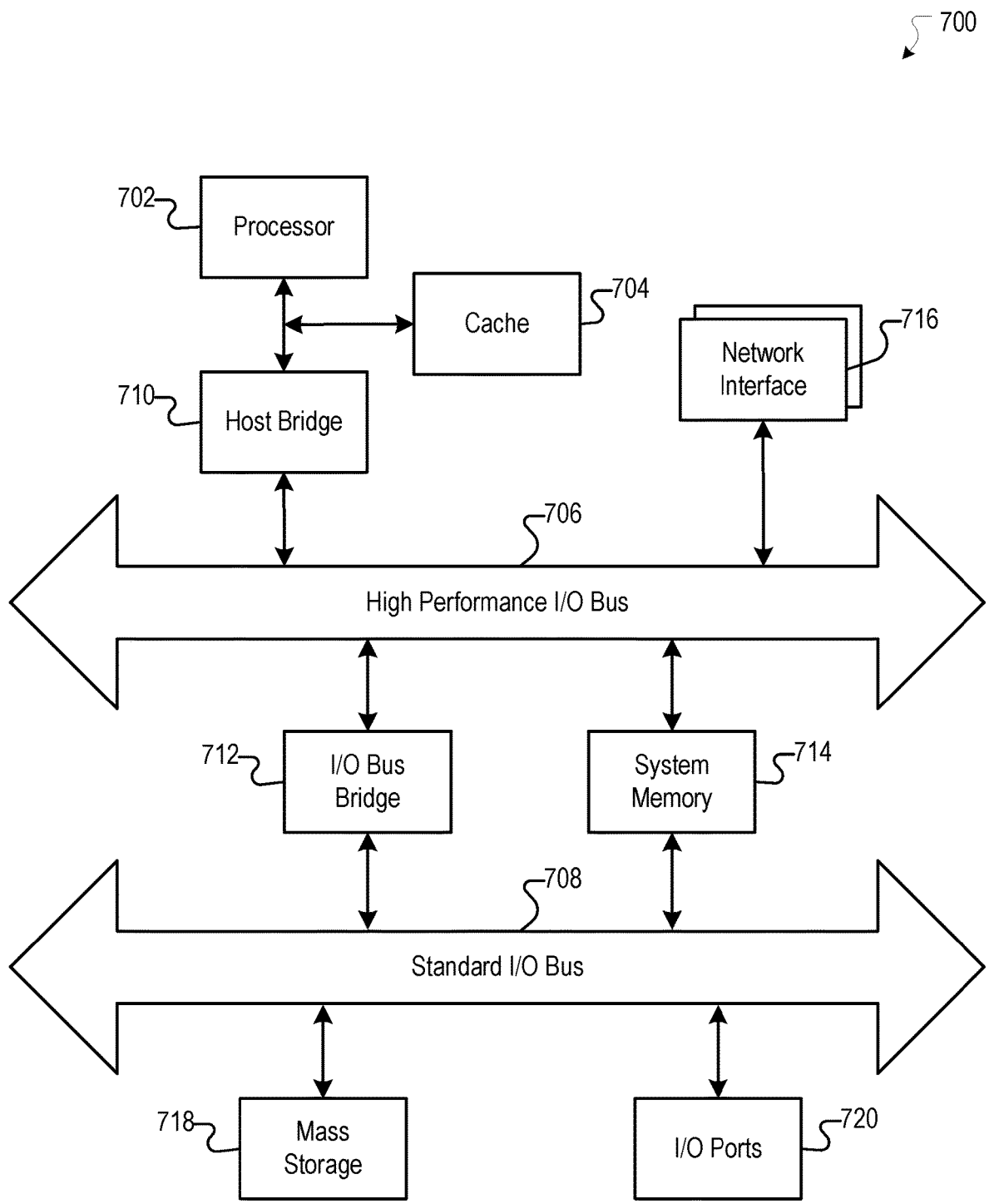
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    creating, by a computing system, a vector space of vector representations of terms of a resume corpus using a machine learning model;
    identifying, by the computing system, search keywords used by recruiters as anchor points in the vector space;
    creating, by the computing system, a chunk of resume terms from a resume based on a selected chunk size and a selected increment value;
    identifying, by the computing system, a vector representation in the vector space for each resume term in the chunk;
    generating, by the computing system, an array of values representing frequencies of the resume terms in the chunk;
    generating, by the computing system, an array of values representing frequencies of search keywords; and
    combining, by the computing system, the array of values representing frequencies of the resume terms in the chunk and the array of values representing frequencies of the search keywords to generate a score for the resume.

2. The computer-implemented method of claim 1, further comprising:
    combining the vector representations for each resume term in the chunk to generate a vector representation of the chunk.

3. The computer-implemented method of claim 2, further comprising:
    identifying an anchor point constituting a search keyword that is nearest to the vector representation of the chunk.

4. The computer-implemented method of claim 1, further comprising:
    normalizing the array of values representing frequencies of the resume terms in the chunk based on relative importance of the resume terms.

5. The computer-implemented method of claim 4, wherein the array of values representing frequencies of the resume terms in the chunk is a row in a resume matrix and the array of values representing frequencies of search terms associated with a search is a column of a search term matrix.

6. The computer-implemented method of claim 5, wherein the combining the array of values comprises:
    multiplying the resume matrix and the search term matrix to generate a score matrix.

7. The computer-implemented method of claim 6, wherein each column of the score matrix reflects resume scores for an associated search.

8. A system comprising:
    at least one processor; and
    a memory storing instructions that, when executed by the at least one processor, cause the system to perform:
        creating a vector space of vector representations of terms of a resume corpus using a machine learning model;
        identifying search keywords used by recruiters as anchor points in the vector space;
        creating a chunk of resume terms from a resume based on a selected chunk size and a selected increment value;
        identifying a vector representation in the vector space for each resume term in the chunk;
        generating an array of values representing frequencies of the resume terms in the chunk;
        generating an array of values representing frequencies of search keywords; and combining the array of values representing frequencies of the resume terms in the chunk and the array of values representing frequencies of the search keywords to generate a score for the resume.

9. The system of claim 8, wherein the instructions, when executed by the at least one processor of the system, further cause the system to perform:
   combining the vector representations for each resume term in the chunk to generate a vector representation of the chunk.

10. The system of claim 9, wherein the instructions, when executed by the at least one processor of the system, further cause the system to perform:
   identifying an anchor point constituting a search keyword that is nearest to the vector representation of the chunk.

11. The system of claim 8, wherein the instructions, when executed by the at least one processor of the system, further cause the system to perform:
   normalizing the array of values representing frequencies of the resume terms in the chunk based on relative importance of the resume terms.

12. The system of claim 11, wherein the array of values representing frequencies of the resume terms in the chunk is a row in a resume matrix and the array of values representing frequencies of search terms associated with a search is a column of a search term matrix.

13. The system of claim 12, wherein the combining the array of values comprises:
   multiplying the resume matrix and the search term matrix to generate a score matrix.

14. The system of claim 13, wherein each column of the score matrix reflects resume scores for an associated search.

15. A non-transitory computer-readable storage medium including instructions that, when executed by at least one processor of a computing system, cause the computing system to perform:
   creating a vector space of vector representations of terms of a resume corpus using a machine learning model;
   identifying search keywords used by recruiters as anchor points in the vector space;
   creating a chunk of resume terms from a resume based on a selected chunk size and a selected increment value;
   identifying a vector representation in the vector space for each resume term in the chunk;
   generating an array of values representing frequencies of the resume terms in the chunk;
   generating an array of values representing frequencies of search keywords; and
   combining the array of values representing frequencies of the resume terms in the chunk and the array of values representing frequencies of the search keywords to generate a score for the resume.

16. The non-transitory computer-readable storage medium of claim 15, wherein the instructions, when executed by the at least one processor of the computing system, further cause the computing system to perform:
   combining the vector representations for each resume term in the chunk to generate a vector representation of the chunk.

17. The non-transitory computer-readable storage medium of claim 16, wherein the instructions, when executed by the at least one processor of the computing system, further cause the computing system to perform:
   identifying an anchor point constituting a search keyword that is nearest to the vector representation of the chunk.

18. The non-transitory computer-readable storage medium of claim 15, wherein the instructions, when executed by the at least one processor of the computing system, further cause the computing system to perform:
   normalizing the array of values representing frequencies of the resume terms in the chunk based on relative importance of the resume terms.

19. The non-transitory computer-readable storage medium of claim 18, wherein the array of values representing frequencies of the resume terms in the chunk is a row in a resume matrix and the array of values representing frequencies of search terms associated with a search is a column of a search term matrix.

20. The non-transitory computer-readable storage medium of claim 19, wherein the combining the array of values comprises:
   multiplying the resume matrix and the search term matrix to generate a score matrix.

* * * * *